(12) United States Patent
Kim (10) Patent No.: US 7,023,173 B2
(45) Date of Patent: Apr. 4, 2006

(54) APPARATUS FOR DRIVING BRUSHLESS MOTOR AND METHOD OF CONTROLLING THE MOTOR

(75) Inventor: Tae-Duk Kim, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 25 days.

(21) Appl. No.: 10/773,159

(22) Filed: Feb. 9, 2004

(65) Prior Publication Data

US 2004/0263113 A1    Dec. 30, 2004

(30) Foreign Application Priority Data

Jun. 27, 2003    (KR) ...................... 10-2003-0042328

(51) Int. Cl.
*H02P 5/28*    (2006.01)

(52) U.S. Cl. ...................... 318/810; 318/811; 318/809; 318/606

(58) Field of Classification Search ................ 318/802, 318/138, 139, 245, 254, 439, 727
See application file for complete search history.

(56) References Cited

U.S. PATENT DOCUMENTS

| | | | | |
|---|---|---|---|---|
| 5,221,881 A | * | 6/1993 | Cameron | 318/254 |
| 5,306,988 A | * | 4/1994 | Carobolante et al. | 318/254 |
| 5,317,243 A | * | 5/1994 | Cameron | 318/254 |
| 5,428,273 A | * | 6/1995 | Doring | 318/138 |
| 5,672,948 A | * | 9/1997 | Cohen et al. | 318/603 |
| 5,859,512 A | * | 1/1999 | Buthker | 318/254 |
| 6,034,493 A | * | 3/2000 | Boyd et al. | 318/254 |
| 6,057,674 A | * | 5/2000 | Bangerter | 323/211 |
| 6,153,989 A | * | 11/2000 | Kardash et al. | 318/254 |
| 6,181,093 B1 | * | 1/2001 | Park et al. | 318/254 |
| 6,462,495 B1 | * | 10/2002 | Copeland | 318/439 |
| 6,479,956 B1 | * | 11/2002 | Kawabata et al. | 318/254 |
| 6,534,938 B1 | * | 3/2003 | Wu et al. | 318/254 |
| 6,661,192 B1 | * | 12/2003 | Copeland | 318/439 |
| 6,850,022 B1 | * | 2/2005 | Liu et al. | 318/439 |
| 6,879,124 B1 | * | 4/2005 | Jiang et al. | 318/439 |
| 2002/0030462 A1 | * | 3/2002 | Matsushiro et al. | 318/727 |
| 2002/0033684 A1 | * | 3/2002 | Jensen et al. | 318/439 |
| 2003/0062860 A1 | * | 4/2003 | Wu et al. | 318/254 |
| 2004/0135530 A1 | * | 7/2004 | Liu et al. | 318/439 |

FOREIGN PATENT DOCUMENTS

KR    10-189122    6/1998

* cited by examiner

*Primary Examiner*—Paul Ip
(74) *Attorney, Agent, or Firm*—Staas & Halsey LLP (57) ABSTRACT

An apparatus for driving a brushless motor and method of controlling the motor, which actively changes an output time of a phase commutation signal depending on variation of a load and stably operating the motor in an overloaded state and improving an operational efficiency of a system. The apparatus for driving a brushless motor includes an inverter, a driver, a counter-electromotive voltage detector and a controller. The inverter switches driving voltages applied to multi-phase stator coils. The driver drives the inverter. The counter-electromotive voltage detector detects a counter-electromotive voltage induced from an unexcited stator coil. The controller calculates a time required to detect a counter-electromotive voltage through the counter-electromotive voltage detector after the driving voltage is turned off, determines a phase commutation point of time based on the determined elapsed time, and controls the driver to perform phase commutation at the determined phase commutation time.

28 Claims, 6 Drawing Sheets

APPARATUS FOR DRIVING BRUSHLESS MOTOR AND METHOD OF CONTROLLING THE MOTOR

CROSS-REFERENCE TO RELATED APPLICATIONS

This application claims the benefit of Korean Application No. 2003-42328, filed Jun. 27, 2003, in the Korean Intellectual Property Office, the disclosure of which is incorporated herein by reference.

BACKGROUND OF THE INVENTION

1. Field of the Invention

The present invention relates to an apparatus for driving a brushless motor and method of controlling the motor and, more particularly, to an apparatus for driving a brushless motor and method of controlling the motor, which detects a position of a rotor based on a counter-electromotive voltage.

2. Description of the Related Art

In general, an output torque of a brushless motor is generated by an interaction between magnetic flux generated from magnetic poles of a rotor and a current flowing in a stator coil. Accordingly, to maximize the output torque, a current should be applied to the stator coil at a phase located near a position where the magnetic flux generated from the magnetic poles of the rotor is maximized.

However, since positions of the magnetic poles of the rotor change as the motor is rotated, a stator coil corresponding to a phase to which a current should be applied frequently changes. Accordingly, to apply the current to the phase of the stator coil corresponding to the positions of the magnetic poles of the rotor, it is necessary to perform phase commutation at an appropriate point of time.

Figure 1:
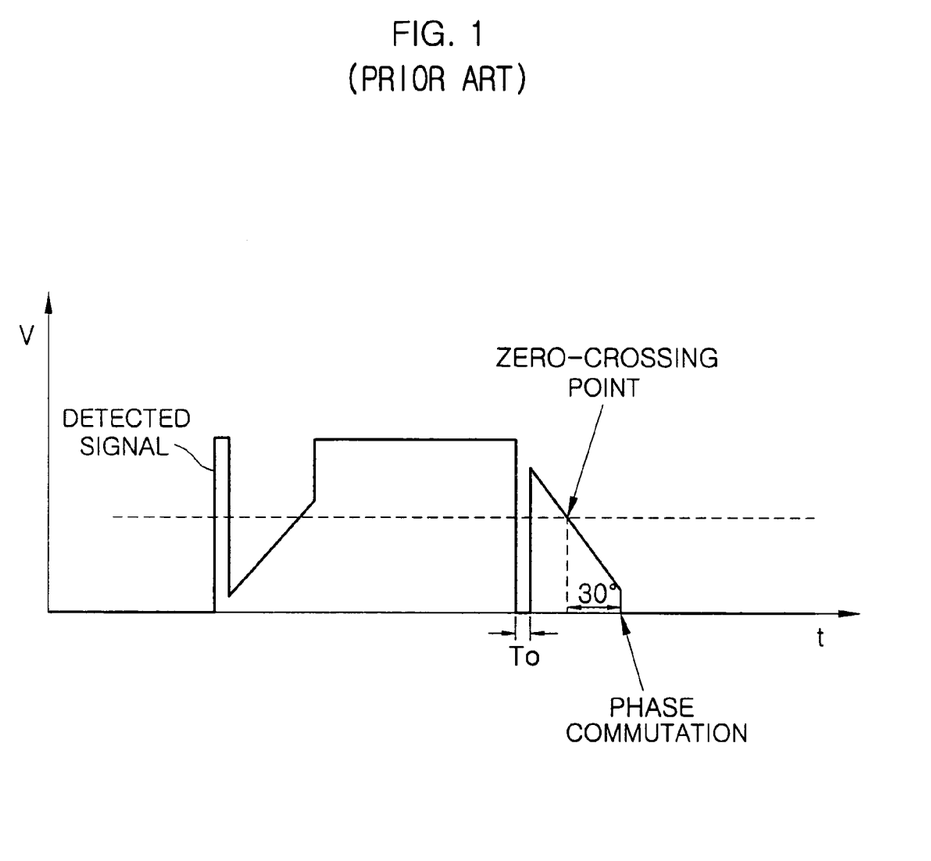
FIG. 1 is a waveform diagram of a counter-electromotive voltage illustrating phase commutation in a conventional apparatus for driving a brushless motor.

Accordingly, phase commutation is performed by outputting a phase commutation signal and applying a current to a corresponding phase of the stator coil at a point of time when a predetermined delay time (generally, corresponding to an electrical angle of 30°) has elapsed after a counter-electromotive voltage induced from an unexcited stator coil has reached a predetermined zero-crossing point, as shown in FIG. 1.

In conventional methods, phase commutation is normally performed when a load current has a normal value. However, extinction of a current is not instantaneous due to an inductance component of the stator coil of the motor when the load current is greater than the normal value. In the latter case, a period To of FIG. 1 is lengthened, so that the counter-electromotive voltage is generated later than desired. Accordingly, a time required for the counter-electromotive voltage to reach the zero-crossing point is lengthened and phase commutation is performed later than desired. Therefore, a current is not applied, at an appropriate time, to the stator coil of a phase located near a position where magnetic flux generated from the magnetic poles of the rotor is maximized. Consequently, the output torque of the motor is decreased. In a worst case, the conventional methods are problematic in that the motor enters an out-of-step range where a rotation control of the motor is no longer performed and, therefore, the motor is stopped.

SUMMARY OF THE INVENTION

Accordingly, it is an aspect of the present invention to provide an apparatus for driving a brushless motor and method of controlling the motor allowing phase commutation to be performed at an appropriate time even through a load current varies, thereby stably driving the motor. A position of a rotor is based on a counter-electromotive voltage induced from an unexcited stator coil instead of using a sensor for detecting a position of a rotor.

The foregoing and other aspects of the present invention are achieved by an apparatus for driving a brushless motor, the brushless motor being a multi-pole, multi-phase brushless motor equipped with a plurality of stator coils. A driving apparatus includes an inverter switching driving voltages applied to the multi-phase stator coils, a driver driving the inverter, and a counter-electromotive voltage detector detecting a counter-electromotive voltage induced from an unexcited stator coil. A controller determines an elapsed time required to detect a counter-electromotive voltage through the counter-electromotive voltage detector after the driving voltage has been turned off determining a phase commutation point of time based on the determined elapsed time, and controlling the driver to perform phase commutation at the determined phase commutation point of time.

The controller determines a reference point of time based on the counter-electromotive voltage, and determines a point of time, which is earlier than the determined reference point of time by a preset time corresponding to the determined elapsed time, as the phase commutation point of time.

According to an aspect of the present invention, the preset time is proportional to the determined elapsed time. The reference point of time is a point of time when a predetermined delay time has elapsed after the counter-electromotive voltage has reached a preset zero-crossing point. The zero-crossing point corresponds to an average voltage, between a highest voltage and a lowest voltage, of points at which the phases intersect.

The foregoing and other aspects of the present invention are also achieved by a method of controlling a brushless motor, the brushless motor being a multi-pole, multi-phase brushless motor equipped with a plurality of stator coils. The method includes determining an elapsed time from a falling edge of a driving voltage to a rising edge of a counter-electromotive voltage in an unexcited state of the brushless motor, determining a phase commutation point of time depending on the counted time, and performing phase commutation at the determined phase commutation point of time.

The method further includes determining a reference point of time based on the counter-electromotive voltage, and determining a time, which is earlier than the determined reference point of time by a preset time corresponding to the determined elapsed time, as the phase commutation point of time. The preset time is proportional to the determined elapsed time.

The foregoing and other aspects of the present invention are further achieved by a method of controlling a brushless motor, the brushless motor performing phase commutation at a reference point of time determined based on a counter-electromotive voltage induced from an unexcited stator coil, the method including counting a time from a falling edge of an unexcited driving voltage to a rising edge of the counter-electromotive voltage, determining whether the counter-electromotive voltage reaches a preset zero-crossing point, and determining a time earlier than the reference point of time by a reduced amount of a delay time corresponding to the determined elapsed time upon the counter-electromotive voltage reaching the preset zero-crossing point, as a phase commutation point of time. The reduced amount of the delay time is proportional to the determined elapsed time.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
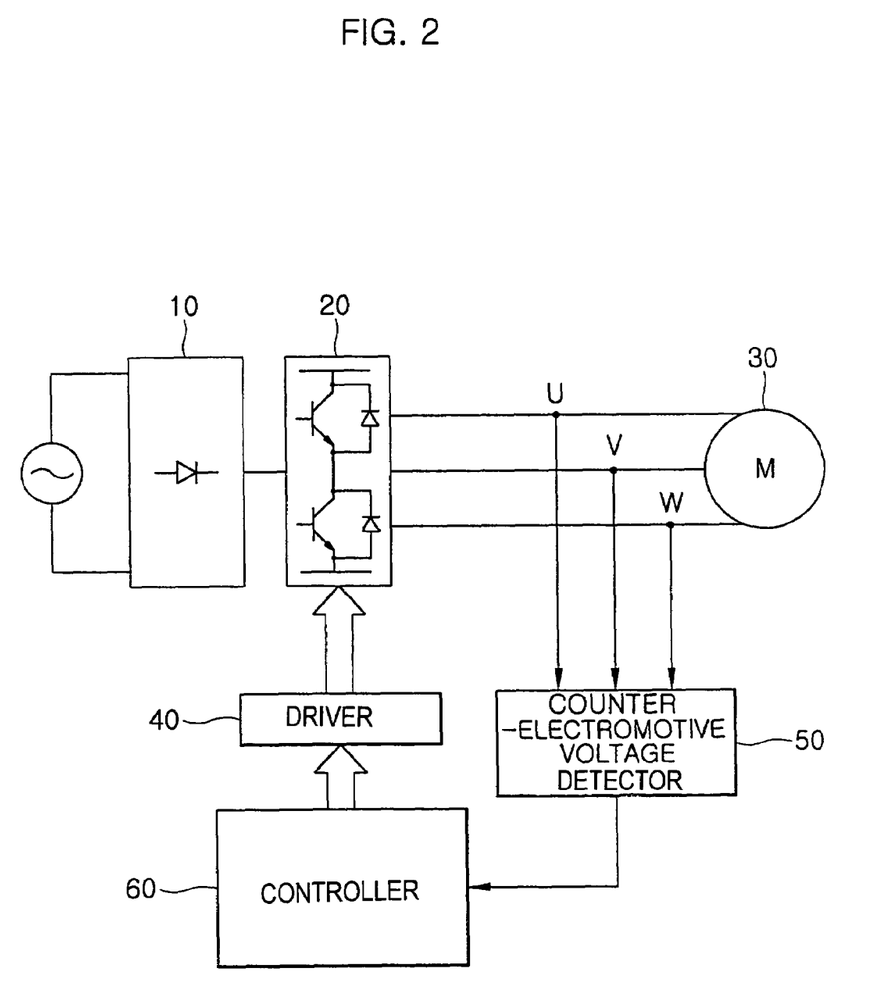
FIG. 2 is a control block diagram of an apparatus for driving a brushless motor, according to an aspect of the present invention.

FIG. 2 is a control block diagram of an apparatus for driving a brushless motor, according to an embodiment of the present invention. As shown in FIG. 2, the apparatus for driving a brushless motor according to an aspect of the present invention includes a controller 60, a driver 40, an inverter 20 and a counter-electromotive voltage detector 50. The controller 60 outputs control signals with respect to phases U, V, and W controlling a brushless motor 30. The driver 40 receives the control signals output from the controller 60 and outputs driving signals driving the brushless motor 30. The inverter 20 includes a plurality of switches switching the phases U, V and W in response to the driving signals of the driver 40. The counter-electromotive voltage detector 50 detects a counter-electromotive voltage induced from each of the phases U, V and W. In FIG. 2, a reference numeral 10 designates a rectifier.

The brushless motor 30 includes a stator where stator coils of phases U, V and W are connected at first ends thereof to each other like a general 3-phase motor. The motor also includes a rotor having magnetic poles using permanent magnets. The brushless motor 30 is connected to a load.

According to an aspect of the present invention, differences between the phases U, V and W are substantially 120°.

Figure 3:
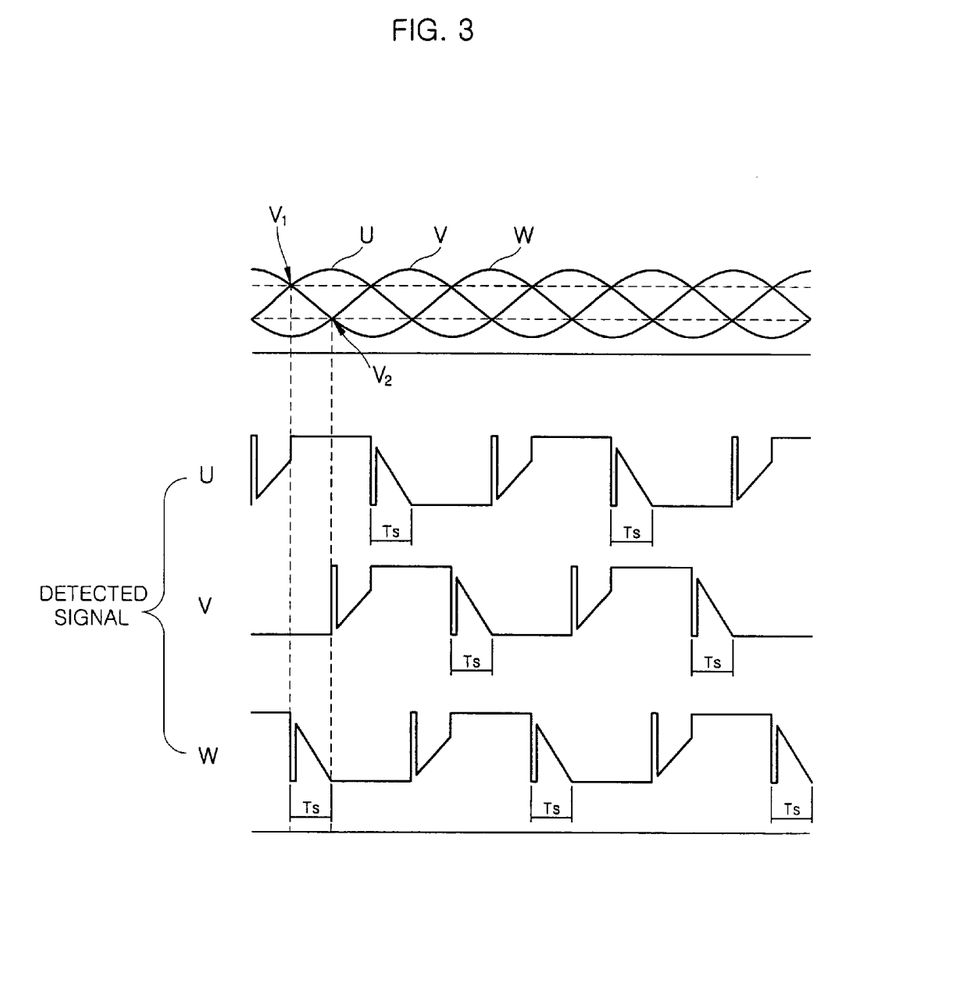
FIG. 3 is a waveform diagram showing counter-electromotive voltages in respective phases.

As shown in FIG. 3, the controller 60 commutes the phases U, V and W by driving the switching elements of the inverter 20 through the driver 40. The controller 60 repeatedly rotates the rotor of the brushless motor 30 for a period corresponding to an electrical angle ranging from 0° to 120°, detecting each of counter-electromotive voltages for a period Ts corresponding to an electrical angle ranging from 120° to 180°, rotating the rotor of the brushless motor 30 for a period corresponding to an electrical angle ranging from 180° to 300°, and detecting the counter-electromotive voltages for a period corresponding to an electrical angle ranging from 300° to 360°. In this case, the controller 60 actively changes a phase commutation point of time depending on a time, which is required to detect a counter-electromotive voltage, based on signals detected by the counter-electromotive voltage detector 50. This active changing is performed instead of performing phase commutation at a point of time when a predetermined time has elapsed after the counter-electromotive voltage has reached a zero-crossing point, that is, a point corresponding to an average voltage between a highest voltage V1 and a lowest voltage V2 of points at which the phases U, V and W intersect each other. Accordingly, phase commutation is performed at a desired time even though the load current or the number of rotations of the brushless motor 30 varies. Thus, the brushless motor 30 is stably operated.

Hereinafter, an operation of the controller 60 is described with reference to FIGS. 3 to 5.

Detected counter-electromotive voltage signals generated by switching operations of the switching elements of the inverter 20 are shown in FIG. 3.

Figure 4:
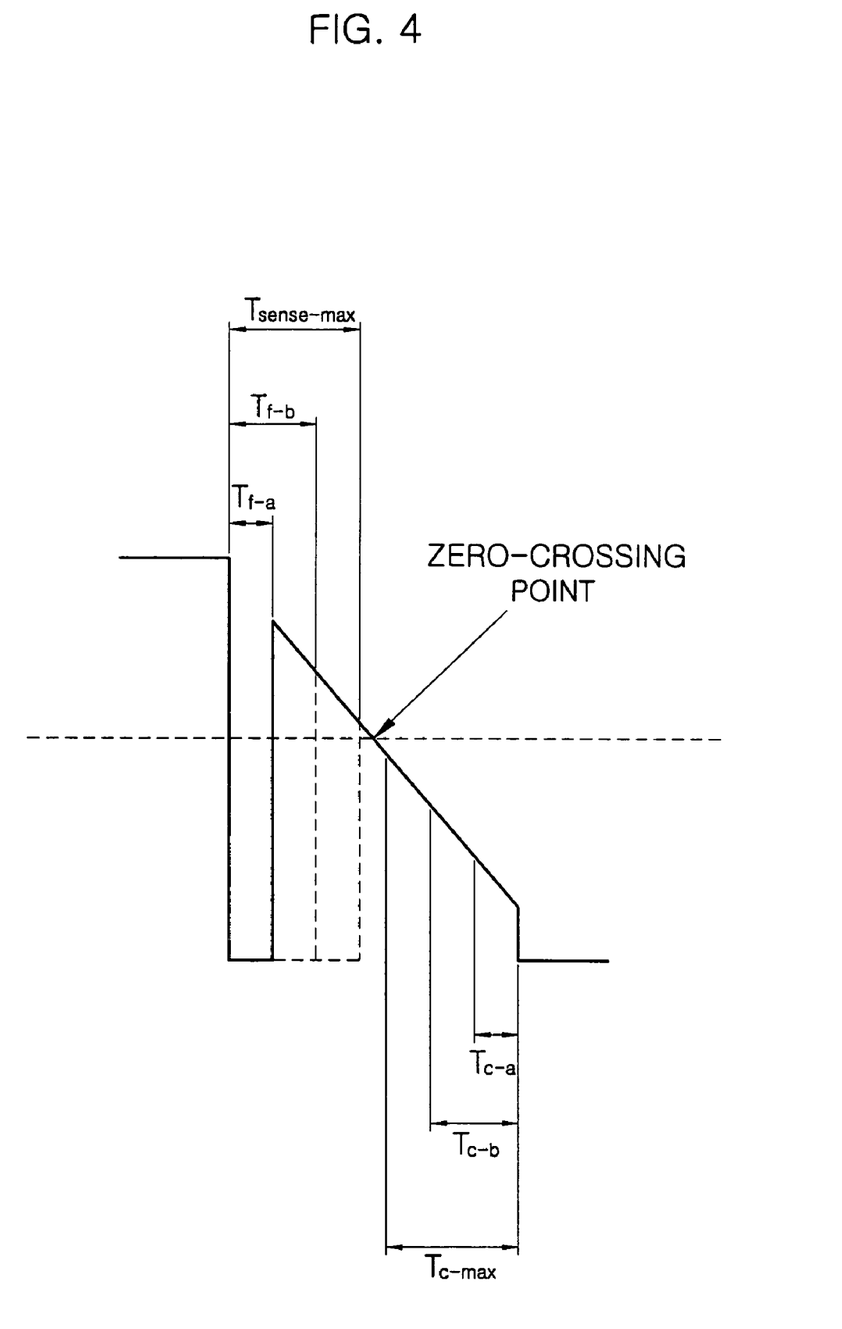
FIG. 4 is an enlarged view showing a waveform of a counter-electromotive voltage of one phase of FIG. 3, which illustrates a concept of an aspect of the present invention.

A counter-electromotive voltage induced from an unexcited stator coil of the brushless motor 30 is shown in FIG. 4. In a case where a time required to detect a rising edge of the counter-electromotive voltage is Tf-a or Tf-b, where Tf-a<Tf-b after a terminal voltage of the corresponding stator coil has been turned off, phase commutation is performed at a point of time earlier than a point of time corresponding to an electrical angle of 30°. The time corresponds to a reduced Tc-a or Tc-b, respectively, delay time after the counter-electromotive voltage has reached a zero-crossing point. That is, in the case where the time required to detect the counter-electromotive voltage is Tf-a, the phase commutation signal is output at a time corresponding to an electrical angle of 30°-Tc-a after the counter-electromotive voltage has reached the zero-crossing point. In the case where the time required to detect the counter-electromotive voltage is Tf-b, the phase commutation signal is output at a time corresponding to an electrical angle of 30°-Tc-b after the counter-electromotive voltage has reached the zero-crossing point.

Figure 5:
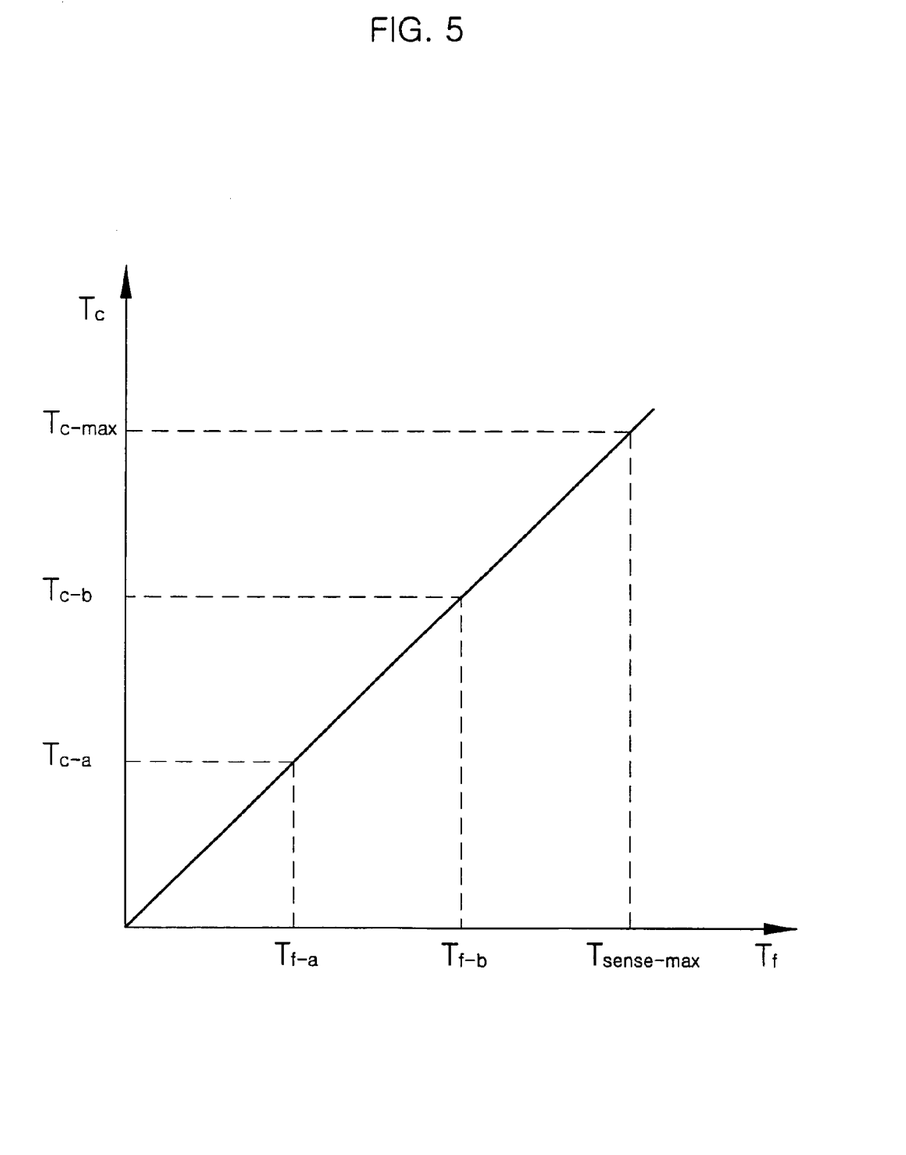
FIG. 5 is a graph illustrating a relation between a time required to detect a counter-electromotive voltage and a reduced amount of a delay time of phase commutation.

If a time of output of the phase commutation signal is varied by application of the reduced amount of the delay time of phase commutation depending on the time required to detect the counter-electromotive voltage, the time of output of the phase commutation signal is made earlier in proportion to the required time as shown in FIG. 5. That is, since the time of output of the phase commutation signal is made earlier in proportion to the time required to detect the counter-electromotive voltage, the brushless motor 30 is stably operated when in an overloaded state. In this case, Tf-max is a maximum time required to detect the zero-crossing point in a current rotation speed range of the brushless motor 30. A maximally reduced amount Tc-max of the delay time, proportional to the Tf-max, is less than, or equal to, the time corresponding to 30°, a maximum electrical angle.

Figure 6:
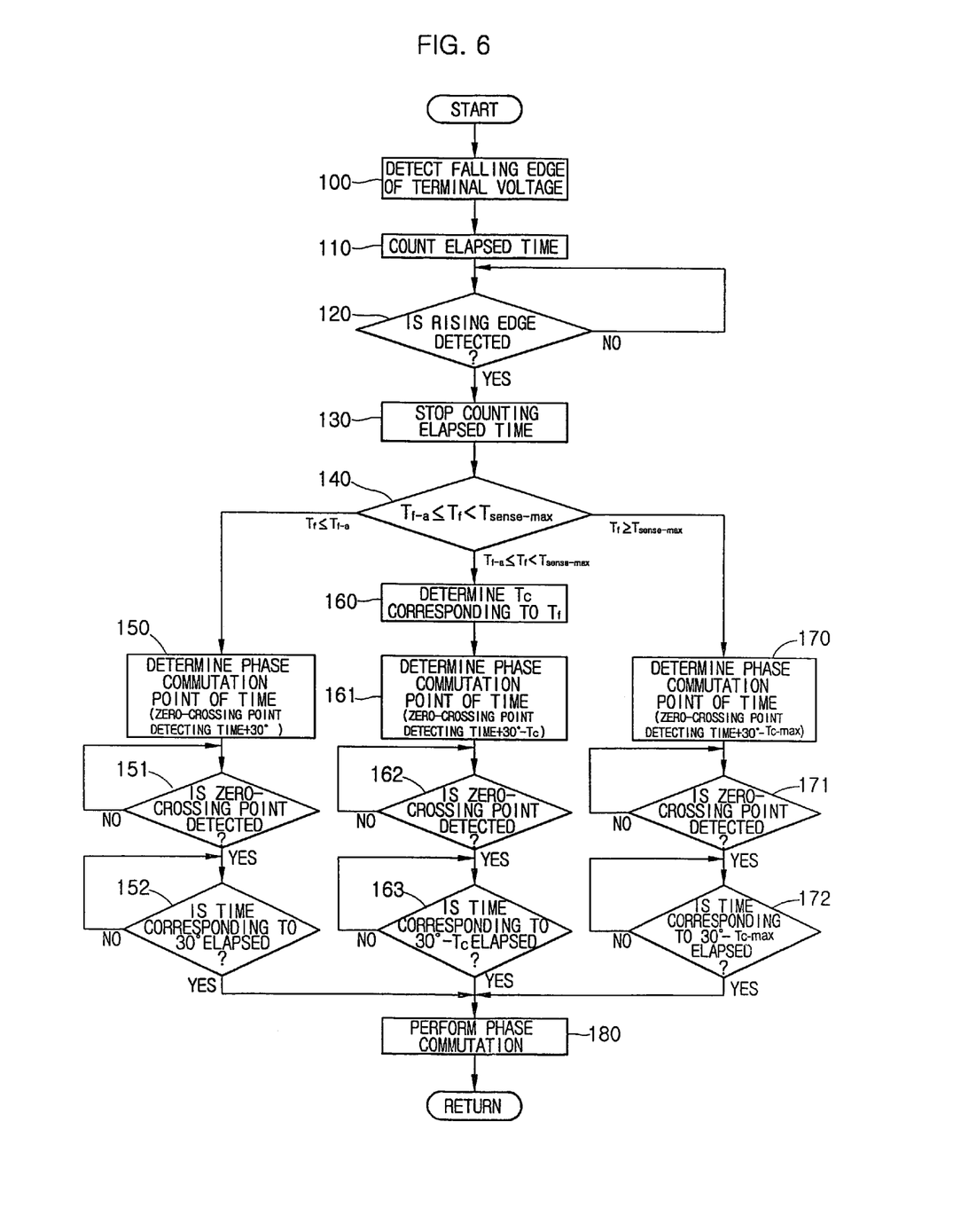
FIG. 6 is a flowchart illustrating a method of controlling the brushless motor, according to an of the present invention.

FIG. 6 is a flowchart illustrating a method of controlling the brushless motor, according to an aspect of the present invention. Referring to FIG. 6, the controller 60 detects the falling edge of the terminal voltage in an unexcited state in which driving voltage is turned off, in operation 100.

The controller 60 determines the elapsed time after detecting the falling edge, in operation 110.

Thereafter, the controller 60 determines whether a rising edge of the counter-electromotive voltage induced from an unexcited stator coil is detected in operation 120. Upon determining that the rising edge of the counter-electromotive voltage is not detected in operation 120, detection is again attempted.

However, if it is determined that the rising edge of the counter-electromotive voltage is detected, in operation 120, the controller 60 stops the counting of the elapsed time, in operation 130. Thereafter, a phase commutation point of time at which the terminal voltage is applied to a next phase is determined depending on the determined elapsed time Tf from the falling edge of the terminal voltage to the rising edge of the counter-electromotive voltage.

According to an aspect of the invention, in operation 140, to determine the range of the determined elapsed time Tf, the determined elapsed time Tf is compared with the minimum detection time Tf-a and the maximum detection time Tsense-max previously set.

Upon determining, as a result of operation 140, that the determined elapsed time Tf is less than the minimum detection time Tf-a, the motor 30 is determined to be in an underloaded state where a load is very small. Thus, a minimally reduced amount of the delay time is applied. This case is similar to the case where phase commutation is performed at a time when a time, corresponding to the electrical angle of 30°, has elapsed after a zero-crossing point has been detected. Accordingly, a point of time when the time corresponding to the electrical angle of 30° has elapsed, after the zero-crossing point has been detected, in operation 150, is determined as the point of time for phase commutation. After the zero-crossing point is detected, in operation 151, upon determining 152 that the time corresponding to the electrical angle of 30° has elapsed, the phase commutation signal is output and, therefore, phase commutation is performed applying a driving voltage to a next phase, in operation 180.

Upon determining, in operation 140, that the determined elapsed time Tf is equal to or greater than the minimum detection time Tf-a and is less than the maximum detection time Tsense-max, a reduced amount Tc of the delay time, which is previously set to correspond to the determined elapsed time Tf and is proportional to the determined elapsed time Tf is determined, in operation 160. Thereafter, a time, corresponding to the time corresponding to the electrical angle of 30°-Tc elapsed after the zero-crossing point has been detected, is determined as the time for phase commutation point of time, in operation 161. After the zero-crossing point is detected in, operation 162, upon determining that a time corresponding to the electrical angle of 30°-Tc has elapsed, in operation 163, the phase commutation signal is output. Thus, phase commutation is performed applying a driving voltage to a corresponding phase, in operation 180. That is, the reduced amount Tc of the delay time is actively changed so as to be proportional to the determined elapsed time Tf. Thus the motor 30 is stably operated in an overloaded state.

Additionally, since the motor 30 is in the overloaded state where a load is very large upon determining, in operation 140, that the determined elapsed time Tf is equal to or greater than the maximum detection time Tsense-max, the maximum reduced amount Tc-max of the delay time is applied making the phase commutation point of time as soon as possible. Accordingly, a point of time, when a time corresponding to an electrical angle of 30°-Tc-max has elapsed after the zero-crossing point is detected is determined as the phase commutation point of time, in operation 170.

After the zero-crossing point is detected, in operation 171, upon determining that a time corresponding to an electrical angle of 30°-Tc-max has elapsed, in operation 172, a phase commutation signal is output. Phase commutation is performed applying a driving voltage to a corresponding phase, in operation 180.

According to an aspect of the present invention, whether the counter-electromotive voltage is detected within a preset time is confirmed. The determined elapsed time Tf, determined elapsed in operation 110, is compared to the maximum detection time Tf-max at which detection of the counter-electromotive voltage is maximally delayed. Upon determining that the determined elapsed time Tf is greater than the maximum detection time Tf-max to detect the counter-electromotive voltage, detecting of the counter-electromotive voltage does not continue and phase commutation is forcibly performed applying the terminal voltage to a next phase after a preset delay time.

As apparent from the above description, aspects of the present invention provide an apparatus driving a brushless motor and method of controlling the motor, which actively changes an output time of a phase commutation signal depending on variation of a load. Thus, the motor stably operates in an overloaded state improving operational efficiency of a system including the motor.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for driving a multi-pole, brushless motor having a plurality of multi-phase stator coils, the driving apparatus comprising:
    an inverter switching driving voltages applied to the multi-phase stator coils;
    a driver driving the inverter;
    a counter-electromotive voltage detector detecting a counter-electromotive voltage induced from an unexcited stator coil; and
    a controller determining an elapsed time required to detect a counter-electromotive voltage through the counter-electromotive voltage detector after the driving voltage is turned off, to determine a phase commutation point of time based on the determined elapsed time, and controlling the driver to perform phase commutation at the determined phase commutation point of time.

2. The apparatus according to claim 1, wherein the controller determines a reference point of time based on the counter-electromotive voltage, and determines a point of time, which is earlier than the determined reference point of time by a preset time corresponding to the determined elapsed time, as the phase commutation point of time.

3. The apparatus according to claim 2, wherein the preset time is proportional to the determined elapsed time.

4. The apparatus according to claim 2, wherein the reference point of time is a point of time when a predetermined delay time has elapsed after the counter-electromotive voltage has reached a preset zero-crossing point.

5. The apparatus according to claim 4, wherein the zero-crossing point corresponds to an average voltage between a highest voltage and a lowest voltage of points at which the phases intersect each other.

6. The apparatus according to claim 1, wherein a difference between a first and a second phase of the plurality of the multi-phase stator coils is substantially 120°.

7. A method of controlling a multi-pole, brushless motor equipped with a plurality of multi-phase stator coils, the method comprising:
determining an elapsed time from a falling edge of a driving voltage to a rising edge of a counter-electromotive voltage in an unexcited state of the brushless motor;
determining a phase commutation point of time depending on the determined elapsed time; and
performing phase commutation at the determined phase commutation point of time.

8. The method according to claim 7, further comprising:
determining a reference time based on the counter-electromotive voltage; and
determining a time earlier than the determined reference time by a preset time corresponding to the determined elapsed time as the phase commutation time.

9. The method according to claim 8, wherein the preset time is proportional to the determined elapsed time.

10. A method of controlling a brushless motor performing phase commutation at a reference time determined based on a counter-electromotive voltage induced from an unexcited stator coil, the method comprising:
determining an elapsed time from a falling edge of an unexcited driving voltage to a rising edge of the counter-electromotive voltage;
determining whether the counter-electromotive voltage reaches a preset point; and
determining a time earlier than the reference point of time by a reduced amount of a delay time corresponding to the determined elapsed time, upon the counter-electromotive voltage reaching the preset point, as a phase commutation point of time.

11. The method according to claim 10, wherein the reduced amount of the delay time is proportional to the determined elapsed time.

12. The method according to claim 10, wherein the preset point is a preset zero-crossing point.

13. A method of controlling a brushless motor equipped with a plurality of multi-phase stator coils, the method comprising:
determining an elapsed time from a first edge of a first voltage to a second edge of a second voltage for an unexcited state of the brushless motor;
determining a time for phase commutation depending on the determined elapsed time; and
performing phase commutation at the phase commutation point of time.

14. The method according to claim 13, further comprising:
determining a reference point of time based on the first voltage or the second voltage; and
determining a time earlier than the determined reference point of time by a preset time corresponding to the determined elapsed time as the phase commutation point of time.

15. The method according to claim 14, wherein the preset time is proportional to the determined elapsed time.

16. A method of controlling a brushless motor performing phase commutation at a reference time determined based on a first voltage induced from an unexcited stator coil, the method comprising:
determining an elapsed time from a first edge of an unexcited second voltage to a rising edge of the first voltage;
determining whether the first voltage reaches a preset point; and
determining a time earlier than the reference point of time by a reduced amount of a delay time corresponding to the determined elapsed time, upon the first voltage reaching the preset point, as a phase commutation point of time.

17. The method according to claim 16, wherein the reduced amount of the delay time is proportional to the determined elapsed time.

18. The method according to claim 17, wherein the preset point is a preset zero-crossing point.

19. A method of controlling a brushless motor, comprising:
detecting a falling edge of a terminal voltage in an unexcited state in which a driving voltage is turned off;
upon detection of a rising edge of a counter-electromotive voltage, determining the elapsed time after the detecting the falling edge of the terminal voltage; and
performing phase commutation at a point of time depending on the determined elapsed time.

20. The method of controlling a brushless motor according to claim 19, wherein the performing phase commutation comprises:
comparing the determined elapsed time with a predetermined minimum detection time and a predetermined maximum detection time.

21. The method of controlling a brushless motor according to claim 20, wherein the performing phase commutation further comprises:
upon determining that the compared determined elapsed time is less than the minimum detection time, setting the point of time for phase commutation as the time corresponding to a electrical angle of 30° elapsing after a zero-crossing point is detected,
detecting a zero-crossing point,
determining that the time corresponding to the electrical angle of 30° has elapsed,
outputting a phase commutation signal, and
applying a driving voltage to a next phase.

22. The method of controlling a brushless motor according to claim 20, wherein the performing phase commutation further comprises:
upon determining that the determined elapsed time is equal to or greater than a minimum detection time and is less than a maximum detection time, determining a delay time proportional to the determined elapsed time,
setting the point of time for phase commutation as the time corresponding to an electrical angle of 30°—the determined delay time elapsing after a zero-crossing point is detected,
outputting a phase commutation signal, and
applying a driving voltage to a next phase.

23. The method of controlling a brushless motor according to claim 20, wherein the performing phase commutation further comprises:
upon determining that the determined elapsed time is greater than, or equal to, a maximum detection time, setting the point of time for phase commutation as the time corresponding to an electrical angle of 30°—a maximum delay time elapsing after a zero crossing point is detected,
outputting a phase commutation signal, and
applying a driving voltage to a next phase.

24. An apparatus for driving a brushless motor having multi-phase stator coils, comprising:
- an inverter switching at least one voltage applied to the multi-phase stator coils;
- a driver driving the inverter; and
- a controller determining an elapsed time required to detect a first voltage after a second voltage is turned off, to determine a phase commutation point of time based on the determined elapsed time, and controlling the driver to perform phase commutation at the determined phase commutation point of time.

25. The apparatus according to claim 24, wherein the controller determines a reference point of time based on the first voltage or the second voltage, and determines a point of time, which is earlier than the determined reference time by a preset time corresponding to the time, as the phase commutation time.

26. The apparatus according to claim 25, wherein the preset time is proportional to the determined elapsed time.

27. The apparatus according to claim 25, wherein the reference point of time is a point of time when a predetermined delay time has elapsed after the first voltage or the second voltage has reached a preset crossing point.

28. The apparatus according to claim 27, wherein the crossing point corresponds to an average voltage between a highest voltage and a lowest voltage of points at which the phases intersect each other.

* * * * *

UNITED STATES PATENT AND TRADEMARK OFFICE
CERTIFICATE OF CORRECTION

PATENT NO. : 7,023,173 B2  Page 1 of 1
APPLICATION NO. : 10/773159
DATED : April 4, 2006
INVENTOR(S) : Tae-Duk Kim It is certified that error appears in the above-identified patent and that said Letters Patent is hereby corrected as shown below:

Column 8, line 21, after "time after", delete "the"

Column 8, line 37, after "to" delete "a" and insert --an--

Column 8, line 64, change "zero crossing" to --zero-crossing--

Signed and Sealed this

Twenty-second Day of August, 2006

JON W. DUDAS
*Director of the United States Patent and Trademark Office*